Figure 1:
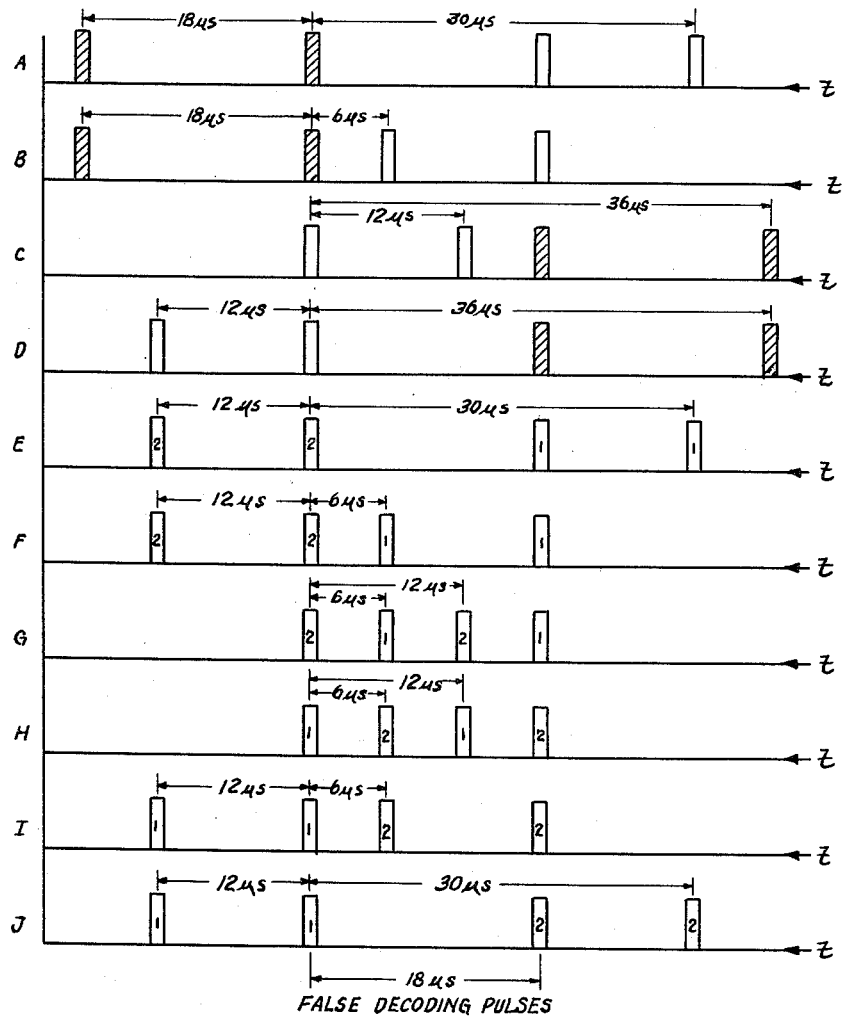

Aug. 28, 1962

J. F. SULLIVAN

3,051,928

PULSE PAIR DECODER

Filed June 30, 1959

2 Sheets-Sheet 1

FALSE DECODING PULSES

▨ = DATA-LINK PULSE, 18 μs SPACING

▯ = DME PULSE, 12 μs SPACING

INVENTOR.
JOHN F. SULLIVAN

BY Alfred C. Hill

AGENT

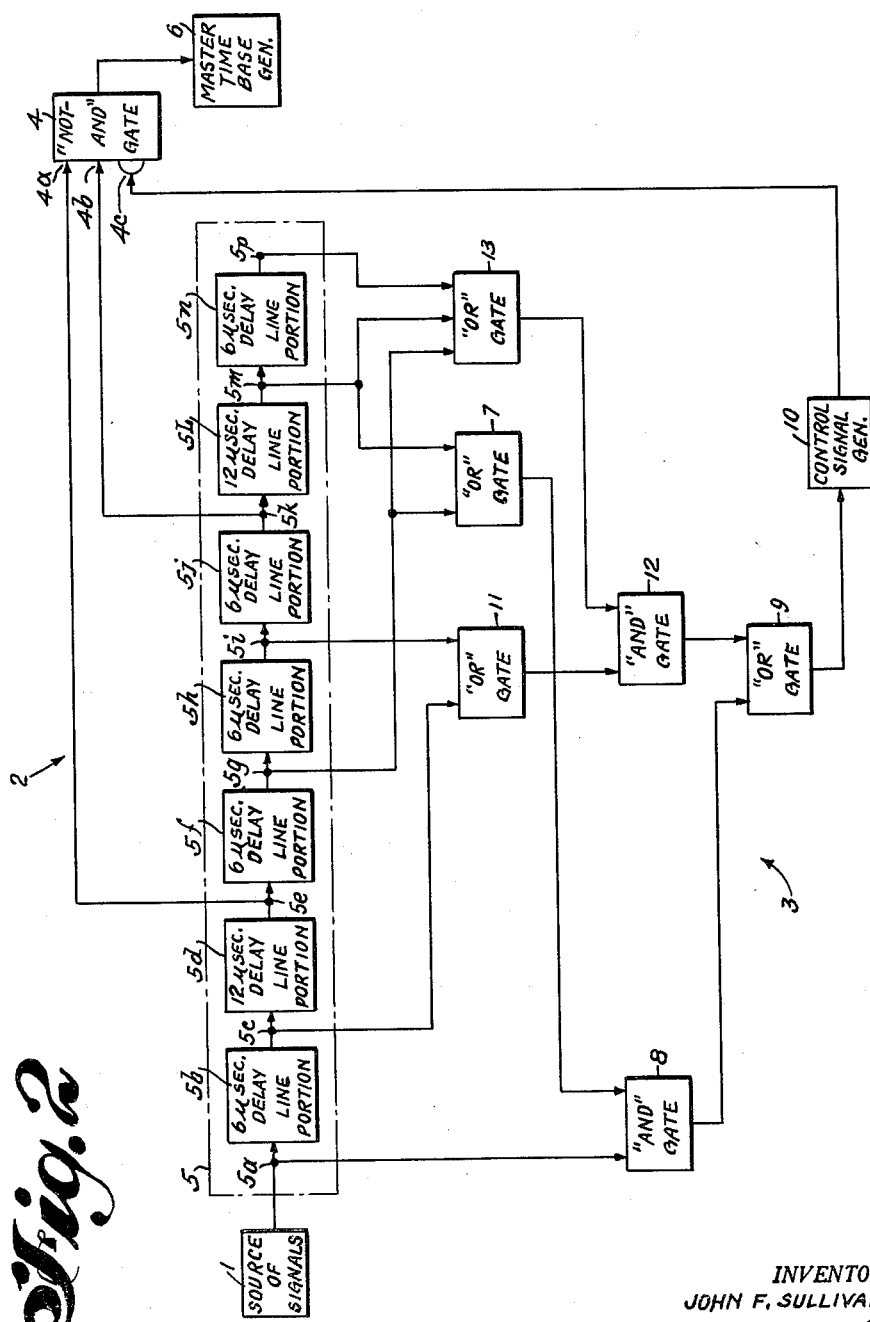

United States Patent Office 3,051,928
Patented Aug. 28, 1962

3,051,928
PULSE PAIR DECODER
John F. Sullivan, Bloomfield, N.J., assignor to International Telephone and Telegraph Corporation, Nutley, N.J., a corporation of Maryland
Filed June 30, 1959, Ser. No. 823,967
6 Claims. (Cl. 340—167)

This invention relates to signal decoders and more particularly to a decoder for generating an output signal upon occurrence of a given pair of pulses spaced a predetermined time interval having particular utility in, but not necessarily restricted to, TACAN (Tactical Air Navigation System).

TACAN is a polar-coordinate navigational system by means of which an aircraft measures its bearing and distance with respect to a surface beacon to which it is tuned. For distance measurement, the airborne transmitter transmits interrogating pulses. The surface beacon receives these pulses and transmits replies automatically over the ground-to-air channel and by measuring the time elapsed between its transmitted pulse and the received reply, the airborne receiver computes the radio travel time and hence the line-of-sight distance between the aircraft and the surface equipment. The transmission in both directions is by pulse pairs with 12 microsecond spacing, hereinafter referred to as DME (distance measuring equipment) pulses or pulse pair.

The precise location in time of roughly 50 percent of the pulses transmitted from the surface beacon does not affect bearing and distance measurement. Thus, a small percentage of the surface beacon pulses may be arranged into code groups to provide additional information. The additional information can be transmitted from or to the aircraft and may be altitude, air speed, identity, or landing instructions. The communication mode of TACAN is called TACAN data link. The data-link transmission from air to ground is by pulse pairs with 18 microsecond spacing, hereinafter referred to as data-link pulses or pulse pair.

One of the components required by TACAN data-link ground receivers is a decoder which filters out interference and provides an output only upon the reception of an 18 microsecond pulse pair. The decoder output is then employed to start a master time base generator for use within the system. Prior art pulse pair decoders include 18 microsecond delay lines which detect the presence of a data-link pulse pair among the many pulses received. A disadvantage of these decoders is that it is possible that a pair of pulses spaced 18 microseconds may be received and decoded, and yet not be a true data-link pulse pair. The occurrence and characteristics of these false pulse pairs will be discussed further hereinbelow as the discussion of the improved decoder of this invention is developed.

One object of the present invention is to provide an improved decoder for decoding a given pair of pulses.

Another object of the present invention is to provide a decoder for decoding a given pair of pulses overcoming the above indicated false decoding problem.

Still another object of the present invention is to provide a decoder for decoding a given pair of pulses producing a control signal to prevent a false decoder output.

A feature of the present invention is a decoder for generating an output signal upon occurrence of a given pair of pulses spaced a predetermined time interval comprising a source of a plurality of time spaced pulses where the plurality of pulses include the given pair of pulses and other time spaced pulses, certain ones of which may be spaced said predetermined time interval, means to detect a pair of pulses spaced said predetermined time interval, means to detect whether the detected pair of pulses is the given pair of pulses, and means to produce an output when the detected pair of pulses is the given pair of pulses.

Another feature of the present invention is a decoder of the type described wherein the means to detect the pair of pulses spaced a predetermined time interval includes a delay line having a plurality of taps spaced therealong at given time intervals.

Still another feature of the present invention is a decoder of the type described wherein certain taps along the delay line are coupled to a means to produce an output signal in response to the detected pair of pulses, and certain other taps along the delay line are coupled to a means which will detect whether the detected pair of pulses is said given pair of pulses and will produce a control signal in the absence of said given pair of pulses to prevent the production of said output signal.

The above-mentioned and other features and objects of this invention will become more apparent by reference to the following description taken in conjunction with the accompanying drawings, in which:

FIG. 1 is a series of waveforms illustrating the false decoding problem relative to this invention and useful in explaining the operation of the embodiment of FIG. 2; and FIG. 2 is a schematic diagram of an embodiment for a decoder for detecting a given pair of pulses in accordance with the principles of this invention.

The TACAN receiver is capable of receiving DME pulse pairs and data-link pulse pairs. The DME pulse pairs have a time spacing of 12 microseconds on centers while the data-link pulse pairs have a time spacing of 18 microseconds on centers. Since it is possible for the TACAN receiver used by the TACAN data link to receive both DME pulse pairs and data-link pulse pairs, there is a probability of a false 18 microsecond pulse pair existing at the input to the decoder employed to recover the data-link pulse pairs through combinations of DME pulse pairs and data-link pulse pairs or combinations of DME pulse pairs with each other. This resulted in false decoding since prior art decoders are incapable of determining whether the detected pulse pair is false or true. Referring to FIG. 1, a series of ten pulse combinations are illustrated which result in the formation of a false 18 microsecond pulse pair. These ten pulse combinations are the only possible ways in which a false pulse pair can be formed from clashes between DME and data-link pulse pairs. The pulse combination illustrated by curve A demonstrates how the trailing pulse of a DME pulse pair and the leading pulse of a data-link pulse pair may occur at an 18 microsecond time spacing and appear as a false data-link pulse pair. Curve B illustrates how the leading pulse of a DME pulse pair and a leading pulse of a data link pulse pair may appear as a false data-link pulse pair. Likewise, curves C and D illustrate the two remaining ways in which DME and data-link pulses could combine to produce a false data-link pulse pair. Curves E, F, G, H, I and J illustrate the possible ways in which two DME pulse pairs could combine to produce a false data-link pulse pair. The numerals appearing on the pulses denote whether they are the first or second DME pulse pair. It is to be noted that curves E and J, F and I, and G and H illustrate the same physical pulse spacing and differ only in time of occurrence of the respective DME pulse pairs which form the false pulse pair combination.

If the ten possible pulse combinations illustrated by curves A to J are considered, a rule may be formulated which can be stated thus: if there is a pulse present 12 microseconds before or 12 or 18 microseconds after the second pulse of the 18 microsecond pulse pair concurrent with the occurrence of a pulse 6 or 30 microseconds before the said second pulse, or when there is a pulse present 36 microseconds before the said second pulse concurrent with the occurrence of a pulse either 12 microseconds before or 12 microseconds after said second pulse, then the 18 microsecond pulse pair is not a true data-link pulse pair and the decoder should be prevented from producing an output signal.

Referring to FIG. 2 there is illustrated an embodiment of the decoder of this invention which will overcome the problem of false decoding. In the broadest sense, the decoder will generate an output signal upon occurrence of a given pair of pulses spaced a predetermined time interval and comprises a source of a plurality of time spaced pulses 1, said plurality of pulses including said given pair of pulses and other time space pulses, certain ones of which may be spaced said predetermined time interval, means 2 to detect a pair of pulses spaced predetermined time interval, means 3 to detect whether the detected pair of pulses is said given pair of pulses, and means 4 to produce an output signal when the detected pair of pulses is said given pair of pulses.

More specifically the decoder illustrated in FIG. 2 is designed to include logic circuitry which operates in accordance with the aforesaid rule to produce a control signal to prevent an output upon the occurrence of a false pulse pair. Source of signals 1 represents a source of a plurality of time spaced signals which may be received by the TACAN receiver used by the TACAN data link. The plurality of signals may include data-link pulse pairs, DME interrogating pulse pairs, or random combinations of the two. The signals are fed to a delay line 5 including, in sequence from the input end of delay line 5, delay line portions 5b, 5d, 5f, 5h, 5j, 5L and 5n. Delay line portions 5b, 5f, 5h, 5j and 5n each have a 6 microsecond delay and delay line portions 5d and 5L each have a 12 microsecond delay. Output taps 5a, 5c, 5e, 5g, 5i, 5k, 5m and 5p are disposed at the junction of the delay line portions as indicated. When a true data-link pulse pair spaced 18 microseconds is present, each pulse of the pulse pair will apear simultaneously at delay line tap 5k and delay line tap 5e, taps 5k and 5e being separated by the 18 microsecond delay contributed by delay line portions 5f, 5h, 5j of 6 microseconds each. The pulses are coupled directly to inputs 4a and 4b of "not-and" gate 4. The action of gate 4 is to produce an output due to the simultaneous occurrence of the two pulse inputs coupled thereto. The output signal from gate 4 is an indication that a data-link signal is present and is used to start at least the system master time base generator 6. If the pulse pair spaced at 18 microseconds is due to one of the false combinations of pulses illustrated in curves A to J, FIG. 1, an output signal due to pulses appearing at taps 5e and 5k will be produced, however, detection means 3 will detect that the pair of pulses is not a true data-link pulse pair and will produce an inhibitor control signal which is coupled to "not-and" gate 4 at inhibiting terminal 4c to prevent an output signal from gate 4.

Consider the occurrence of a false pulse pair as illustrated in curve A, FIG. 2. When the false 18 microsecond pulse pair appears at taps 5e and 5k, a pulse will occur 30 microseconds before the trailing pulse of the false pulse pair and therefore appear at tap 5m at the same instant of time that the pulses appear at taps 5e and 5k. Another pulse will occur 18 microseconds after the trailing pulse of the false pulse pair and appear at tap 5a at the same time. All four pulses will appear at their respective taps at the same instant of time due to the action of delay line 5. The pulse from tap 5m is applied to "or" gate 7 causing an output therefrom which is applied to "and" gate 8. The pulse from tap 5a is applied simultaneously to "and" gate 8 thereby producing an output from "and" gate 8 which is fed to "or" gate 9. The output from "or" gate 9 triggers control signal generator 10 which may be in the form of a flip-flop circuit to produce a control signal to prevent the false pulse pair of curve A, FIG. 1, at taps 5e and 5k from producing an output from "not-and' gate 4. Thus, the master time base generator 6 is not falsely started.

Similarly if a false pulse pair of the type illustrated by curve B is received, when the false pulse pair appears at taps 5e and 5k, a pulse 6 microseconds occurring before the trailing pulse of the false pulse pair will appear at tap 5g and a pulse 18 microseconds after the second false pulse will appear at tap 5a at the same instant of time. The pulse from tap 5g will be applied to "or" gate 7 producing an output therefrom which will be applied to "and" gate 8. The pulse from tap 5a will be applied to "and" gate 8 simultaneously with the pulse from "or" gate 7 causing an output signal from "and" gate 8 which is applied to "or" gate 9. The output from "or" gate 9 will trigger control signal generator 10 which in turn will prevent an output signal from "not-and" gate 4 and the master time base generator 6 will not start.

If the combination of pulses illustrated by curve C, FIG. 1 are considered, the false pulse pair will again occur simultaneously at taps 5e and 5k. At the same instant of time a pulse 12 microseconds before the trailing pulse of the false pulse pair will appear at tap 5i and a pulse occurring 36 microseconds before said trailing pulse will appear at tap 5p. The pulse pair occurring at taps 5e and 5k will again tend to trigger gate 4, however, the pulse from 5i will cause an output from "or" gate 11, and that output will be applied to "and" gate 12. The pulse from tap 5p will cause an output from "or" gate 13 which will also be applied to "and" gate 12 producing an output therefrom which will be applied to "or" gate 9. "Or" gate 9 will produce an output which will trigger control signal generator 10 and prevent the occurrence of an output signal from "not-and" gate 4 thereby preventing the starting of master time base generator 6.

It will be evident to one skilled in the art that by following the procedure outlined above with respect to curves A to C, FIG. 1, the remaining possibilities illustrated by curves D to J, FIG. 1, will also cause the decoder to operate to produce a control signal from generator 10 to prevent a false output from "not-and" gate 4.

By employing a decoder of the type described hereinabove, the problem of a false decoding occurring due to combinations of data-link pulse pairs and DME pulse pairs or combination of DME pulse pairs forming false data-link pulse pairs will be overcome, and the accuracy and reliability of the TACAN data link operation will be improved.

While I have described above the principles of my invention in connection with specific apparatus, it is to be clearly understood that this description is made only by way of example and not as a limitation to the scope of my invention as set forth in the objects thereof and in the accompanying claims.

I claim:

1. A decoder for generating an output signal upon the occurrence of a given pair of pulses spaced a predetermined time interval comprising: a source of a plurality of differently timed spaced pulse pairs including said given pair of pulses, such that pulse pairs other than said given pulse pairs may occur spaced said predetermined time interval; a delay line circuit coupled to said source to detect any pair of pulses spaced said predetermined time interval, said delay line comprised of integral multiple time delay sections; a logic circuit network means coupled to said source and to a plurality of said time delay sections of said delay line, said logic circuit network means comprised of interconnected "and," "or" gates effective to produce an inhibit signal upon the occurrence of any pulse pair spaced said predetermined time interval, other than said given pulse pair; gating means coupled to said delay line circuit; and means coupling said logic circuit network means to said gating means for inhibiting said gating means upon the occurrence of any pulse pair spaced said predetermined time interval other than said given pulse pair.

2. A decoder for generating an output signal upon occurrence of a given pair of pulses spaced a predetermined time interval comprising a source of a plurality of time spaced pulses, said plurality of pulses including said given pair of pulses and other time spaced pulses, certain ones of which may be spaced said predetermined time interval, a delay line coupled to said source including, in sequence from the input end of said delay line, a first delay line portion having a predetermined value of time delay equal to one third of said predetermined time interval, a second delay line portion having a value of time delay equal to twice said predetermined value, a third delay line portion having a value of time delay equal to said predetermined value, a fourth delay line portion having a value of time delay equal to said predetermined value, a fifth delay line portion having a value of time delay equal to said predetermined value, a sixth delay line portion having a value of time delay equal to twice said predetermined value and a seventh delay line portion having a value of time delay equal to said predetermined value, a pair of signal paths coupled to the junction of said second and third portions and the junction of said fifth and sixth portions, respectively, to derive an output signal on each of said paths upon the occurrence of a pair of pulses spaced said predetermined time interval, a "not-and" gate coupled to said pair of signal paths to produce an output signal in response to said detected pair of pulses, means coupled to said delay line to produce a control signal in the presence of pulses of said plurality of pulses in a predetermined time relationship with respect to the pulses of said detected pair of pulses, and means to connect the output of said control signal producing means to said "not-and" gate to prevent the production of said output signal therefrom in the presence of said control signal.

3. A decoder for generating an output signal upon occurrence of a given pair of pulses spaced a predetermined time interval comprising a source of a plurality of time spaced pulses, said plurality of pulses including said given pair of pulses and other time spaced pulses, certain ones of which may be spaced said predetermined time interval, a delay line coupled to said source including a plurality of output taps spaced therealong at given time intervals, a pair of signal paths coupled to a first selected two of said taps spaced said predetermined time interval to derive an output signal on each of said paths upon the detection of a pair of pulses spaced said predetermined time interval, means coupled to said pair of signal paths to produce an output signal in response to said detected pair of pulses, means to produce a control signal in the presence of pulses of said plurality of pulses in a predetermined time relationship with respect to the pulses of said detected pair of pulses including a first "or" gate coupled to a second selected two of said taps, a second "or" gate coupled to a third selected two of said taps, a third "or" gate coupled to a selected three of said taps, a first "and" gate coupled to said source and the output of said second "or" gate, a second "and" gate coupled to the outputs of said first and third "or" gates, a fourth "or" gate coupled to the outputs of said first and second "and" gates, means coupled to the output of said fourth "or" gate responsive to signal output therefrom to generate a control signal, and means to connect the output of said control signal generator means to said output signal producing means to prevent the production of said output signal therefrom in the presence of said control signal.

4. A decoder for generating an output signal upon occurrence of a given pair of pulses spaced a predetermined time interval comprising a source of a plurality of time spaced pulses, said plurality of pulses including said given pair of pulses and other time spaced pulses, certain ones of which may be spaced said predetermined time interval, a delay line coupled to said source including in sequence from the input end of said delay line a first delay line portion having a predetermined value of time delay equal to one third of said predetermined time interval, a second delay line portion having a value of time delay equal to twice said predetermined value, a third delay line portion having a value of time delay equal to said predetermined value, a fourth delay line portion having a value of time delay equal to said predetermined value, a fifth delay line having a value of time delay equal to said predetermined value, a sixth delay line portion having a value of time delay equal to twice said predetermined value and a seventh delay line portion having a value of time delay equal to said predetermined value, a pair of signal paths coupled to the junction of said second and third portions and the junction of said fifth and sixth portions, respectively, to derive an output signal on each of said paths upon the occurrence of a pair of pulses spaced said predetermined time interval, a "not-and" gate coupled to said pair of signal paths to produce an output signal in response to said detected pair of pulses, means to produce a control signal in the presence of pulses of said plurality of pulses in a predetermined time relationship with respect to the pulses of said detected pair of pulses including a first "or" gate coupled to the junction of said first and second portions and the junction of said fourth and fifth portions, a second "or" gate coupled to the junction of said third and fourth portions and the junction of said sixth and seventh portions, a third "or" gate coupled to the junction of said third and fourth portions, the junction of the sixth and seventh portions and the end of said seventh portions removed from said last-mentioned junction, a first "and" gate coupled to said source and the output of said second "or" gate, a second "and" gate coupled to the outputs of said first and third "or" gates, a fourth "or" gate coupled to the outputs of said first and second "and" gates, means coupled to the output of said fourth "or" gate responsive to signal output therefrom to generate a control signal, and means to connect the output of said control signal generator means to said "not-and" gate to prevent the production of said output signal therefrom in the presence of said control signal.

5. A decoder for generating an output signal upon occurrences of a given pair of pulses spaced a predetermined time interval comprising a source of a plurality of time spaced pulses, said plurality of pulses including said given pair of pulses and other time spaced pulses, certain ones of which may be spaced said predetermined time interval, a delay line coupled to said source, a plurality of output taps spaced along said delay line including in sequence an output tap spaced a given distance from the input of said delay line to provide a value of time delay equal to one-third said predetermined time interval, a second output tap spaced from said first output tap a distance equal to twice said given distance, a third output tap spaced from said second output tap a distance equal to said given distance, a fourth output tap spaced from said third output tap a distance equal to said given distance, a fifth output tap spaced from said fourth output tap a distance equal to said given distance, a sixth output tap spaced from said fifth output tap, a distance equal to twice said given distance and a seventh output tap spaced from said sixth output tap a distance equal to said given distance, a pair of signal paths coupled to said second output tap and said fifth output tap, respectively, to derive an output signal on each of said paths upon the occurrence of a pair of pulses spaced said predetermined time interval, a "not-and" gate coupled to said pair of signal paths to produce an output signal in response to said detected pair of pulses, means to produce a control signal in the presence of pulses of said plurality of pulses in a predetermined time relationship with respect to the pulses of said detected pair of pulses including a first "or" gate coupled to said first and fourth taps, a second "or" gate coupled to said third and sixth tap, a third "or" gate coupled to said third, sixth and seventh taps, a first "and" gate coupled to said source and the output of said second "or" gate, a second "and" gate coupled to the outputs of said first and third "or" gates, a fourth "or" gate coupled to the outputs of said first and second "and" gates, means coupled to the output of said fourth "or" gate responsive to signal output therefrom to generate a control signal, and means to connect the output of said control signal generator, means to said "not-and" gate to prevent the production of said output signal in the presence of said control signal.

6. A decoder for generating an output signal upon occurrences of a given pair of pulses spaced an 18 microsecond time interval comprising a source of a plurality of time spaced pulses, said plurality of pulses including said given pair of pulses and other pulses, certain ones of which may be spaced said 18 microsecond time interval, a delay line coupled to said source including in sequence from the input end of said delay line a first delay line portion having a 6 microsecond delay, a second delay line portion having a 12 microsecond delay, a third delay line portion having a 6 microsecond delay, a fourth delay line portion having a 6 microsecond delay, a fifth delay line portion having a 6 microsecond delay, a sixth delay line portion having a 12 microsecond delay and a seventh delay line portion having a 6 microsecond delay, a first output tap disposed between said source and said first delay line portion, a second output tap disposed between said source and said first delay line portion, a second output tap disposed between said first delay line portion and said second delay line portion, a third output tap disposed between said second delay line portion and said third delay line portion, a fourth output tap disposed between said third delay line portion and said fourth delay line portion, a fifth output tap disposed between said fourth delay line portion and said fifth delay line portion, a sixth output tap disposed between said fifth delay line portion and said sixth delay line portion, a seventh output tap disposed between said sixth delay line portion and said seventh delay line portion and an eighth output tap disposed at the end of said seventh delay line portion, a pair of signal paths coupled to said third output tap and said sixth output tap, respectively, to derive an output signal on each of said paths upon occurrence of a pair of pulses spaced said 18 microsecond time interval, a "not-and" gate coupled to said pair of signal paths to produce an output signal in response to said detected pair of pulses, means to produce a control signal in the presence of pulses of said plurality of pulses in a predetermined time relationship with respect to the pulses of said detected pair of pulses including a first "or" gate coupled to said second and fifth taps, a second "or" gate coupled to said fourth and seventh taps, a third "or" gate coupled to said fourth, seventh and eighth taps, a first "and" gate coupled to said first tap and the output of said second "or" gate, a second "and" gate coupled to the output of said first and third "or" gates, a fourth "or" gate coupled to the outputs of said first and second "and" gates, means coupled to the output of said fourth "or" gate in response to signal output therefrom to generate a control signal, and means to connect the output of said control signal generator means to said "not-and" gate to prevent the production of said output signal therefrom in the presence of said control signal.

References Cited in the file of this patent
UNITED STATES PATENTS

| | | |
|---|---|---|
| 2,522,609 | Gloess | Sept. 19, 1950 |
| 2,641,698 | Gloess | June 9, 1953 |
| 2,706,810 | Jacobsen | Apr. 19, 1955 |
| 2,779,933 | Bradburd | Jan. 29, 1957 |
| 2,800,584 | Blake | July 23, 1957 |
| 2,884,615 | Garfinkel | Apr. 28, 1959 |